US009422965B2

(12) United States Patent
Campbell, II

(10) Patent No.: US 9,422,965 B2
(45) Date of Patent: Aug. 23, 2016

(54) METHODS AND APPARATUS FOR ASYMMETRICAL FASTENING SYSTEM

(71) Applicant: Bryce Fastener, Inc, Gilbert, AZ (US)

(72) Inventor: Richard Bryce Campbell, II, Gilbert, AZ (US)

(73) Assignee: Bryce Fastener, Inc., Gilbert, AZ (US)

( * ) Notice: Subject to any disclaimer, the term of this patent is extended or adjusted under 35 U.S.C. 154(b) by 510 days.

(21) Appl. No.: 13/891,521

(22) Filed: May 10, 2013

(65) Prior Publication Data

US 2014/0331826 A1     Nov. 13, 2014

(51) Int. Cl.
| | |
|---|---|
| *B25B 23/00* | (2006.01) |
| *F16B 23/00* | (2006.01) |
| *B25B 15/00* | (2006.01) |
| *B21K 1/46* | (2006.01) |

(52) U.S. Cl.
CPC ............ *F16B 23/003* (2013.01); *B21K 1/463* (2013.01); *B25B 15/004* (2013.01); *B25B 15/005* (2013.01); *F16B 23/0007* (2013.01)

(58) Field of Classification Search
CPC ..... B25B 5/004; B25B 5/005; B25B 13/485; F16B 23/003; F16B 23/0007; F16B 23/0076
See application file for complete search history.

(56) References Cited

U.S. PATENT DOCUMENTS

| | | | |
|---|---|---|---|
| 2,066,484 A | 1/1937 | Phillips | |
| 2,285,461 A | 6/1942 | Purtell | |
| 2,445,978 A | 7/1948 | Stellin | |
| 2,474,994 A | 7/1949 | Tomais | |
| 2,813,450 A | 11/1957 | Dzus | |
| 3,237,509 A | 3/1966 | Muenchinger | |
| 3,241,408 A | 3/1966 | McCauley | |
| 3,763,725 A | 10/1973 | Reiland | |
| 3,874,258 A | 4/1975 | Semola et al. | |
| 4,084,478 A | 4/1978 | Simmons | |
| 4,187,892 A * | 2/1980 | Simmons ............. | B25B 15/002 81/441 |
| 4,202,244 A | 5/1980 | Gutshall | |
| 4,269,246 A | 5/1981 | Larson et al. | |
| D285,651 S | 9/1986 | Iwata et al. | |
| D290,581 S | 6/1987 | Hughes | |
| 4,970,922 A | 11/1990 | Krivec | |
| 5,219,253 A | 6/1993 | Shinjo | |
| 5,279,190 A | 1/1994 | Goss et al. | |
| 5,291,811 A * | 3/1994 | Goss ..................... | B25B 13/065 411/404 |
| 5,435,680 A | 7/1995 | Schuster | |
| 5,461,952 A | 10/1995 | Goss | |
| 5,553,983 A | 9/1996 | Shinjo | |
| 5,577,871 A | 11/1996 | Brugola | |
| 6,016,727 A | 1/2000 | Morgan | |
| 6,199,455 B1 | 3/2001 | Wagner | |
| 6,253,649 B1 | 7/2001 | Shinjo | |
| 6,367,358 B1 | 4/2002 | Stacy | |

(Continued)

*Primary Examiner* — Bryan R Muller
(74) *Attorney, Agent, or Firm* — The Noblitt Group, PLLC

(57) ABSTRACT

Methods and apparatus for an asymmetrical fastening system according to various aspects of the present invention include a driver and a fastener that are configured to have corresponding conforming surfaces suitably adapted to provide substantially complete engagement between a torque surface of the driver and a recessed socket area of the fastener. The driver and fastener may each be configured to include a driving surface that is aligned with a longitudinal axis and a removal surface that intersects a radial extending from the longitudinal axis at an oblique angle. The driver and fastener may further include corresponding tapering surfaces that allow the torque surface of the driver to wedge against the recessed socket area of the fastener.

18 Claims, 7 Drawing Sheets

(56) References Cited

U.S. PATENT DOCUMENTS

| | | |
|---|---|---|
| 6,406,376 B1 | 6/2002 | Lin |
| 6,886,433 B2 | 5/2005 | Totsu |
| 7,618,327 B2 * | 11/2009 | Dilling ............... B21K 5/20 411/409 |
| 2012/0312130 A1 * | 12/2012 | Bauer ............... B25B 13/065 81/461 |

* cited by examiner

METHODS AND APPARATUS FOR ASYMMETRICAL FASTENING SYSTEM

BACKGROUND OF INVENTION

Presently fasteners are made with various recesses and matched driving tools such as the Phillips design, straight walled hexagon, and other multi-lobe geometries. The walls and faces of the driver and recess typically are designed to fit closely with each other in order to achieve face-to-face (mating) contact between the driving member and driven surfaces of the fastener. However, to enable insertion of the driver into the recess, there must be some clearance between the driver and the recess of the fastener. As a result, the area of contact is typically less than full face-to-face contact between the driver and the recess of the fastener. Consequently, when torque is applied by the driver, the forces applied to the fastener head and driver are concentrated in localized stress regions. These localized stresses may lead to deformation to the driver or fastener, breakage of the driver, and premature cam-out of the fastener. Efforts to increase the area of contact between the driver and the fastener typically result in increasing face-to-face contact along linear lines. This may provide some increased contact area, but it often creates localized stress and fatigue which can weaken or cause premature wear of the driver.

SUMMARY OF THE INVENTION

Methods and apparatus for an asymmetrical fastening system according to various aspects of the present invention include a driver and a fastener that are configured to have corresponding conforming surfaces suitably adapted to provide substantially complete engagement between a torque surface of the driver and a recessed socket area of the fastener. The driver and fastener may each be configured to include a driving surface that is aligned with a longitudinal axis and a removal surface that intersects a radial extending from the longitudinal axis at an oblique angle. The driver and fastener may further include corresponding tapering surfaces that allow the torque surface of the driver to wedge against the recessed socket area of the fastener.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various types of materials, fastening devices, driver systems and the like, which may carry out a variety of functions. In addition, the present invention may be practiced in conjunction with any number of processes such as the manufacture of fasteners, mechanical attachment, and torque transmitting systems, and the system described is merely one exemplary application for the invention. Further, the present invention may employ any number of conventional techniques for metalworking, component manufacturing, tooling fabrication, and/or forming surfaces.

Methods and apparatus for an asymmetrical fastening system according to various aspects of the present invention may operate in conjunction with any suitable torque delivery system. Various representative implementations of the present invention may also be applied to any device capable of rotating fasteners.

Figure 1:
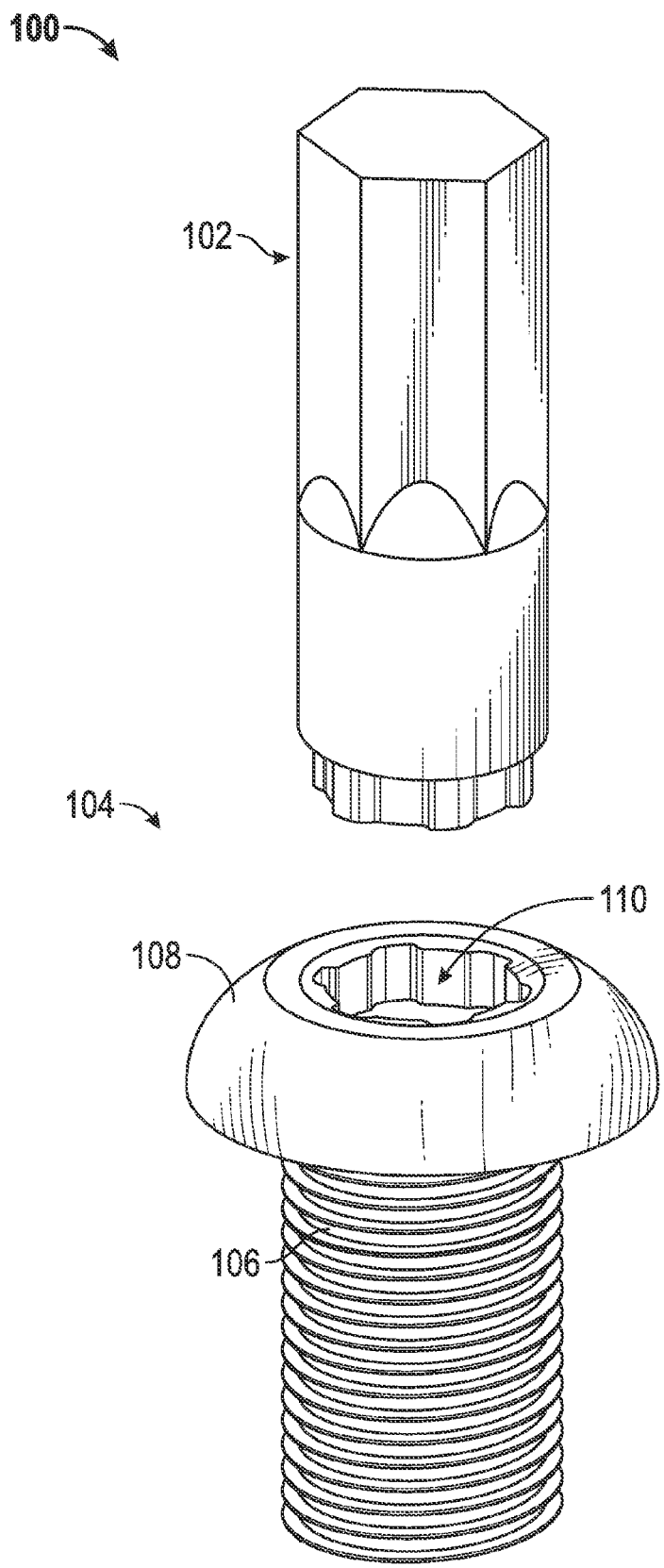
FIG. 1 representatively illustrates a side view of a fastener and a mating driver bit in accordance with an exemplary embodiment of the present invention.

Referring now to FIG. 1, in an exemplary embodiment of the present claims, an asymmetrical fastening system 100 may comprise a driver 102 and a fastener 104 having a shank portion 106 and a head portion 108. The driver 102 may comprise any suitable device or system for mating with the fastener 104 to facilitate a transfer of torque from the driver 102 to the fastener 104. For example, the driver 102 may comprise a multi-lobular surface configured to be selectively inserted into a recessed socket area 110 of the fastener 104 and engage a surface of the recessed socket area 110 that is suitably configured to substantially conform to the multi-lobular surface of the driver 102. The engagement between the driver 102 and the fastener 104 may create sufficient surface contact to couple the driver 102 and the fastener 104 together through a compressed or "stick fit" such that the fastener 104 does not fall off or otherwise automatically disengage from the driver 102 after the driver 102 has been inserted into the recessed socket area 110 of the fastener 104.

The fastener 104 is configured to provide increased face-to-face contact between the recessed socket area 110 and the driver 102. The fastener 104 may comprise any suitable device or system for providing a substantially conforming fit with the driver 102. For example, referring now to FIG. 2, the recessed socket area 110 may comprise a wall 218 extending into the head portion 108 of the fastener 104. The wall 218 may be configured in any suitable shape or dimension for receiving the driver 102 and may include one or more surfaces adapted to allow for the transfer of torque between the driver 102 and the fastener 104.

Figure 2:
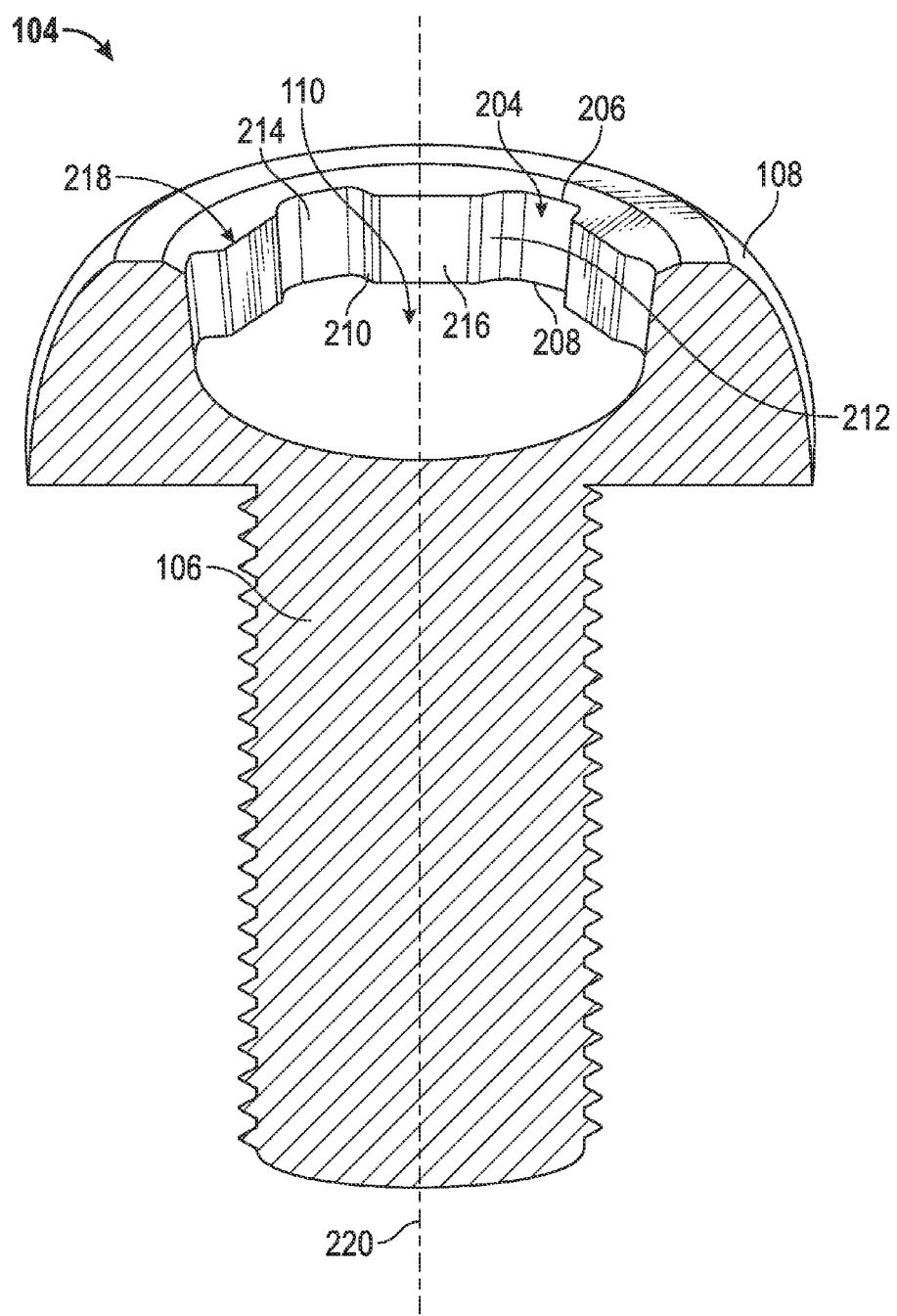
FIG. 2 representatively illustrates a side view of the fastener and recessed socket area in accordance with an exemplary embodiment of the present invention.
Figure 3:
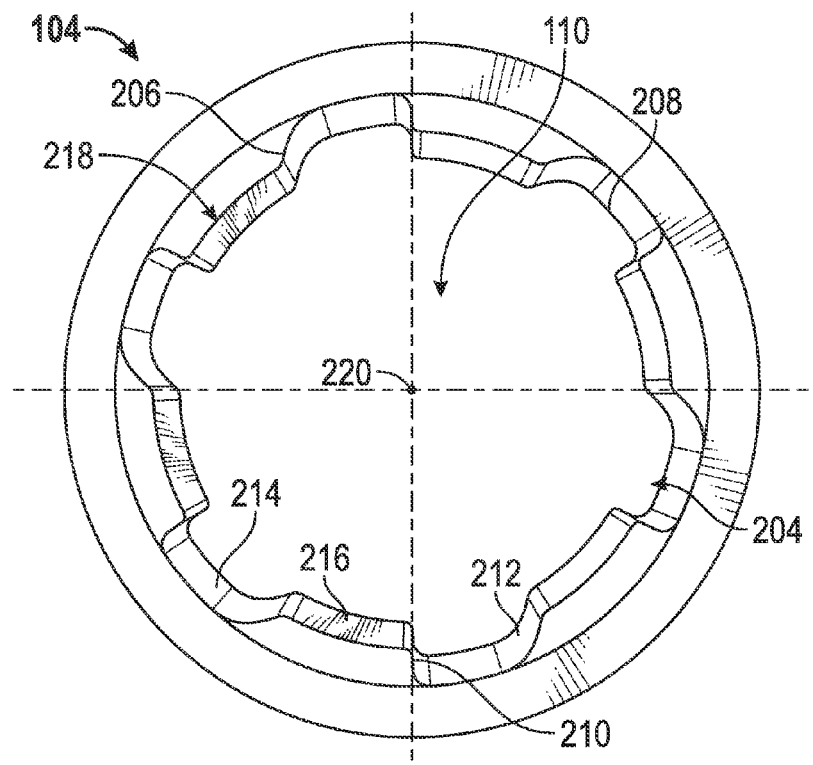
FIG. 3 representatively illustrates a top view of the fastener having six recessed torque surfaces in accordance with an exemplary embodiment of the present invention.

Referring now to FIGS. 2 and 3, in one embodiment, the wall 218 may comprise a surface oriented about a longitudinal axis 220 that defines the recessed socket area 110. The wall 218 may comprise a top edge 206 that forms an opening to the recessed socket area 110 and a bottom edge 208 disposed proximate to a lower most section of the recessed socket area 110. The wall 218 may taper inwardly towards the longitudinal axis 220 between the top edge 206 and the bottom edge 208 such that a cross-sectional area of the recessed socket area 110 decreases as the recessed socket area 110 extends further into the head portion 108. The taper may also correspond to the dimensions of the driver 102 to facilitate a wedge-like fit between the fastener 104 and the driver 102.

The taper of the wall 218 may comprise any suitable angle based upon varying criteria such as circumference of the head portion 108, height of the head portion 108, and/or the strength of the material used to fabricate the fastener 104 or the driver 102. For example, in one embodiment, the wall 218 may have a taper of between two and five degrees relative to the longitudinal axis 220. In a second embodiment, the taper may comprise an angle of up to fifteen degrees relative to the longitudinal axis 220.

The wall 218 may further comprise one or more recessed torque surfaces 204 arranged around the wall 218. The recessed torque surface 204 provides contact surfaces for the driver 102 allowing the fastener 104 to be selectively rotated about the longitudinal axis 220 in a first direction under a driving force and in a second direction under a removal force. For example, the driving force may comprise an installation torque supplied by any suitable device such as a screw driver, a wrench, a powered drill, and the like. Similarly, the removal force may comprise a torque supplied in a substantially opposite direction as the driving force.

In one embodiment, the recessed torque surfaces 204 may comprise a plurality of asymmetrical lobular recesses suitably configured to receive a mating lobe from the driver 102. Referring still to FIGS. 2 and 3, each recessed torque surface 204 may comprise a driving surface 210, a removal surface 212, and a first transition surface 214 extending between the driving surface 210 and the removal surface 212. The wall 218 may form a second transition surface 216 that extends between the driving surface 210 of a first recessed torque surface 204 and the removal surface 212 of a second recessed torque surface 204.

Figure 4:
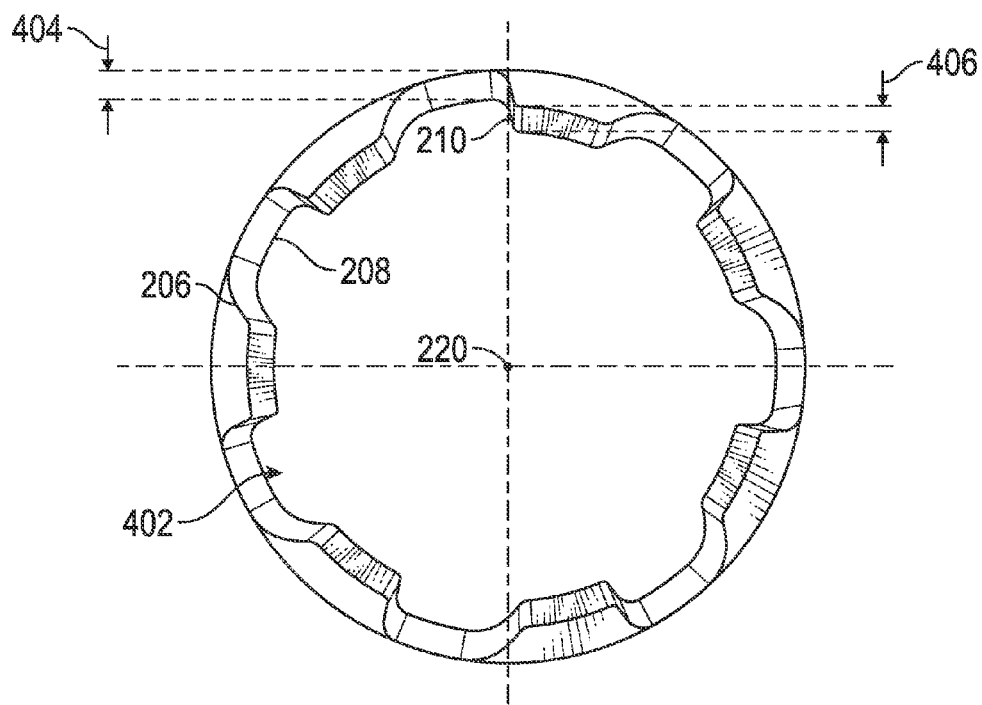
FIG. 4 representatively illustrates a detailed view of the recessed socket area of a fastener having seven recessed torque surfaces in accordance with an exemplary embodiment of the present invention.

The plurality of recessed torque surfaces 204 may comprise any desired number and may be oriented about the longitudinal axis 220. The number of recessed torque surfaces 204 may be determined according to any suitable criteria such as a predetermined torque requirement for a particular use. For example, referring now to FIG. 3, in one embodiment, the plurality of recessed torque surfaces 204 may comprise six asymmetrical lobular recesses spaced equidistantly around a circumference defined by a radial line from the longitudinal axis 220. Referring now to FIG. 4, in a second embodiment, the plurality of recessed torque surfaces 204 may comprise seven asymmetrical lobular recesses spaced equidistant apart around a common circumferential distance from the longitudinal axis 220.

The driving surface 210 provides a contact area for receiving an applied torque from the driver 102. The driving surface 210 may be configured to comprise any suitable shape or dimension. Referring again to FIGS. 2 and 3, in one embodiment, the driving surface 210 may comprise a substantially flat face that is configured to be oriented perpendicular to the driving force such that the face of the driving surface 210 is substantially parallel to a radial line extending from the longitudinal axis 220. The driving surface 210 may also be configured to receive the driving force at a substantially 90° degree angle. The driving surface 210 may intersect the first transition surface 214 and/or the second transition surface 216 at an approximate right angle such that the driving surface 210 forms a substantially vertical surface between the first transition surface 214 and the second transition surface 216.

The driving surface 210 may also remain approximately parallel along an insertion direction of the fastener 104 from the top edge 206 to the bottom edge 208 of the recessed socket area 110 even as the wall 218 tapers inward. As a result, the driving surface 210 forms a large contact area that may be engaged by the driver 102 during engagement. The large contact area allows an applied torque to be more evenly distributed across the entire driving surface and may allow for increased torque values while also being less susceptible to cam-out.

The driving surface 210 may also be configured to comprise a uniform lobular height along the entire surface from the top edge 206 to the bottom edge 208 of the recessed socket area 110. For example, referring now to FIG. 4, in one embodiment, the driving surface 210 of a first recessed torque surface 402 may have a lobular height 404 at the top edge 206 that is the same as a second lobular height 406 at the bottom edge 208. Therefore, although the wall 218 is tapering inward the driving surface 210 forms a substantially rectangular planar surface that remains perpendicular to the driving force.

The removal surface 212 provides a second contact area for receiving an applied torque from the driver 102. The removal surface 212 may be configured to comprise any suitable shape or dimension. Referring again to FIGS. 2 and 3, in one embodiment, the removal surface 212 may comprise a face that is configured to be oriented in a non-parallel manner relative to the driving surface 210. In addition, the removal surface 212 may not be aligned with the longitudinal axis 220 and may intersect a radial line extending from the longitudinal axis 220 at an oblique angle. For example, the removal surface 212 may intersect with the first transition surface 214 and the second transition surface 216 through corner sections having a larger radius as compared to corner sections between the driving surface 210 and the first transition surface 214 and the second transition surface 216. Accordingly, the removal surface 212 may comprise a more gradual sloping surface between first transition surface 214 and the second transition surface 216 as compared to the driving surface 210.

Utilizing larger radiuses at the removal surface 212 may provide extra strength and resistance to shearing along the entire recessed torque surface 204. Thus the fastener 104 may be subjected to higher torque values with less chance of stripping out the recessed torque surfaces 204. For example, Phillips type fasteners have a large flat area perpendicular to the screw insertion direction and a large flat area perpendicular to the removal direction. This arrangement may be highly susceptible to cam out and driver deformation and/or breakage.

Referring now to FIG. 2, the removal surface 212 may also form a non-vertical line relative to the longitudinal axis 220 as it extends from the top edge 206 to the bottom edge 208 of the recessed socket area 110. In one embodiment, the non-vertical line may lie on an angle that causes the first transition surface 214 to become progressively smaller as it descends toward the bottom edge 208 of the recessed socket area 110. In addition, as a result of the reduction in size of the first transition surface 214 the second transition surface 216 increases in size as it descends toward the bottom edge 208 of the recessed socket area 110.

Figure 5A:
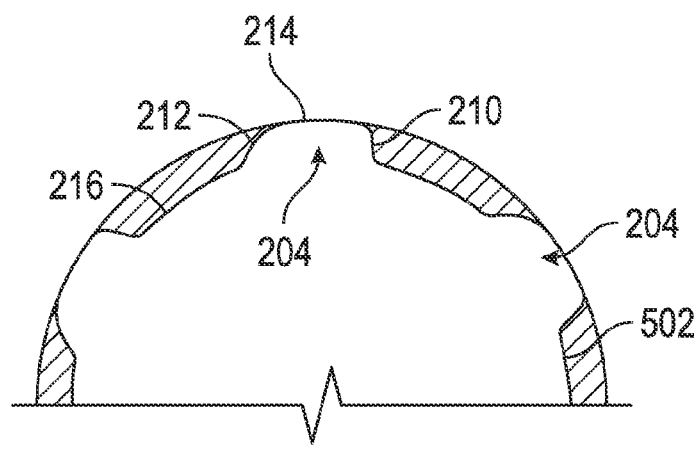
FIG. 5A representatively illustrates a partial cross-sectional view of the recessed torque surfaces at a top edge of the recessed socket area in accordance with an exemplary embodiment of the present invention.
Figure 5B:
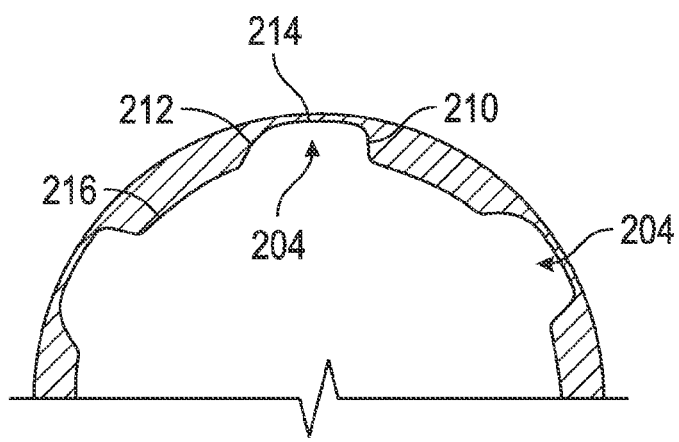
FIG. 5B representatively illustrates a partial cross-sectional view of the recessed torque surfaces at a position between the top edge and a bottom edge of the recessed socket area in accordance with an exemplary embodiment of the present invention.
Figure 5C:
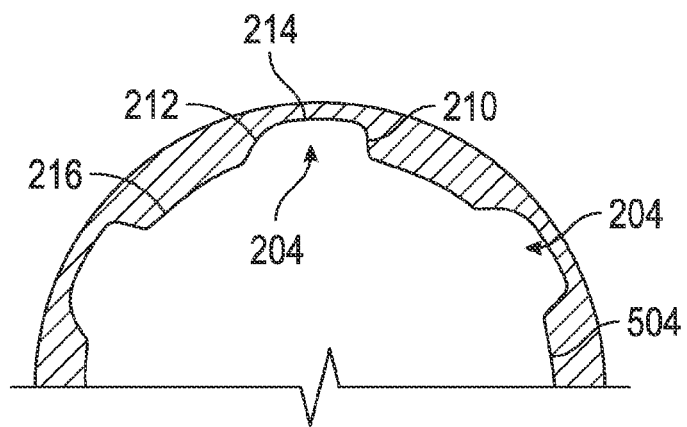
FIG. 5C representatively illustrates a partial cross-sectional view of the recessed torque surfaces at the bottom edge of the recessed socket area in accordance with an exemplary embodiment of the present invention.

Referring now to FIG. 5A, the driving surface 210, the removal surface 212, and the first transition surface 214 may form a lobular polygonal shape in the recessed torque surfaces 204 such that the second transition surface 216 is positioned at a first inner diameter 502 at the top edge 206. The removal surface 212 may be formed with larger radiuses than the driving surface 210 making the entirety of the recessed torque surfaces 204 asymmetrical. Referring now to FIG. 5B, as the driving surface 210, the removal surface 212, the first transition surface 214, and the second transition surface 216 progress to a position between the top edge 206 and the bottom edge 208 of the recessed socket area 110, each surface tapers inwardly closer to the central longitudinal axis 220 such that the polygonal shape of the recessed torque surfaces 204 have a smaller area than at the top edge 206. Referring now to FIG. 5C, as the driving surface 210, the removal surface 212, the first transition surface 214, and the second transition surface 216 progress to the bottom edge 208 of the recessed socket area 110, each surface continues to taper inwardly towards the central longitudinal axis 220 such that the polygonal shape of the recessed torque surfaces 204 have a smaller area at the bottom edge 208 than at the position between the top edge 206 and the bottom edge 208 of the recessed socket area 110. Further, the second transition surface 216 is now position at a second inner diameter 504 that is less than the first inner diameter 502. Throughout the taper from the first inner diameter 502 to the second inner diameter 504, the lobular height of the driving surface 210 remains constant.

A width of the driving surface 210, the removal surface 212, the first transition surface 214, and the second transition surface 216 may be reduced at different rates as each proceeds towards the bottom edge 208 of the recessed socket area 110 making the polygonal shape disproportionate. For example, the removal surface 212 and the first transition surface 214 may be reduced disproportionately compared to the driving surface 210, which may remain proportional between the top edge 206 and the bottom edge 208. Thus as the polygonal shape progresses to the bottom of the recessed socket area 110, the width of the recessed torque surfaces 204 gets smaller, having disproportional material removed below the removal surface 212 and the first transition surface 214. This causes the removal surface 212 to inscribe a line as it proceeds from the top edge 206 to the bottom edge 208, that tapers away from the driving face; being farther away at the top edge 206 and closer at the bottom edge 208. This further causes a width of the second transition surface 216 to increase as the width of the recessed torque surfaces 204 decreases. The resulting shape may create a wedge ramp configured to propel the driver 102 towards the driving surface 210 and improve an overall face-to-face contact when the driver 102 is fully inserted into the recessed socket area 110.

Figure 6:
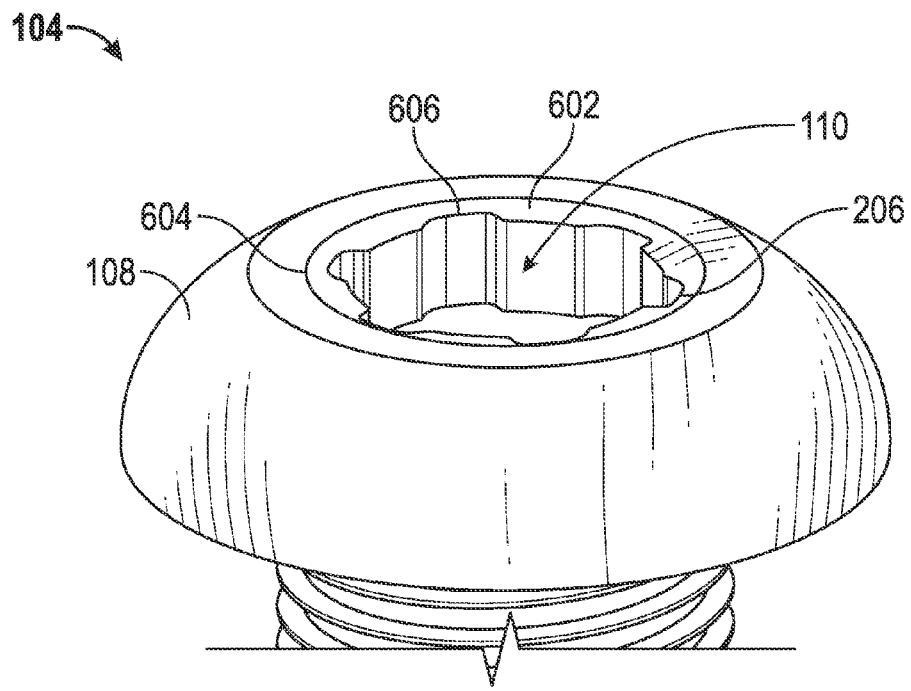
FIG. 6 representatively illustrates a recessed counter bore in accordance with an exemplary embodiment of the present invention.

Referring now to FIG. 6, the head portion 108 may further comprise a radiused counter bore 602 configured to help funnel the driver 102 towards the recessed socket area 110. The radiused counter bore 602 may comprise any suitable shape adapted to capture a driver bit and guide it to the recessed socket area 110. For example, in one embodiment, the radiused counter bore 602 may comprise an inward sloping surface having a larger radius along a surface 604 of the head portion 108 and a smaller radius along a second surface 606 disposed between the top edge 206 and the surface 604 of the head portion 108.

Referring again to FIG. 1, the driver 102 is configured to provide a torque force to the fastener 104. The driver 102 may comprise any suitable shape or size for engaging with the fastener 104. For example, the driver 102 may comprise a surface suitably configured to engage or otherwise substantially conform to the surfaces located within the recessed socket area 110. In one embodiment, the driver 102 may be adapted to provide a stick-fit when inserted into recessed socket area 110 such that the surface frictional forces between the driver 102 and the recessed socket area 110 of the fastener 104 are sufficient to couple the driver 102 and the fastener 104 together.

Figure 7:
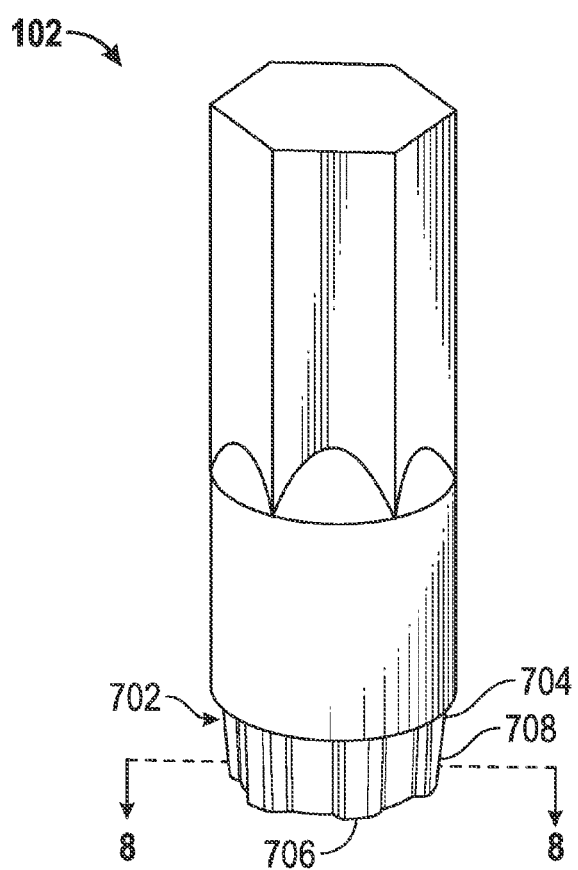
FIG. 7 representatively illustrates the driver bit in accordance with an exemplary embodiment of the present invention.

Referring now to FIG. 7, in one embodiment, the driver 102 may comprise a torque surface 702 having a tapered sidewall 708 that extends between a base portion 704 of the driver 102 and an end portion 706 of the driver 102. The tapered sidewall 708 may comprise the same angle of taper as the wall 218 of the recessed socket area 110 so as to provide a more complete engagement. In addition, a distance between the base portion 704 and the end portion 706 may also be configured to correspond to the distance between the top edge 206 and the bottom edge 208 of the recessed socket area 110. In an alternative embodiment, the distance between the base portion 704 and the end portion 706 may be greater than or less than that of top edge 206 and the bottom edge 208 to ensure sufficient engagement between the driver 102 and the fastener 104 while also accommodating additional features such as a metallic plating or other surface treatment that may be applied to the fastener 104 and result in a decrease to the overall diameter of the recessed socket area 110.

For example, in one embodiment the fastener may comprise a surface coating configures to increase corrosion resistance of the fastener. The application of the surface coating may provide a plating thickness of up to approximately a thousandth of an inch (0.001") to the entire outer surface of the fastener 104. As a result, the diameter of the recessed socket area 110 may be decreased by approximately two thousandths of an inch (0.002"). In another embodiment, the plating thickness may be approximately three ten thousandths of an inch (0.0003") resulting in a decreased diameter of the recessed socket area 110 of about six ten thousandths of an inch (0.0006"). To account for this decrease, the distance between the base portion 704 and the end portion 706 may be increased such that the end portion 706 of the torque surface 702 has a radius less than that of the bottom edge 208 of the fastener before the surface coating was applied.

Figure 8:
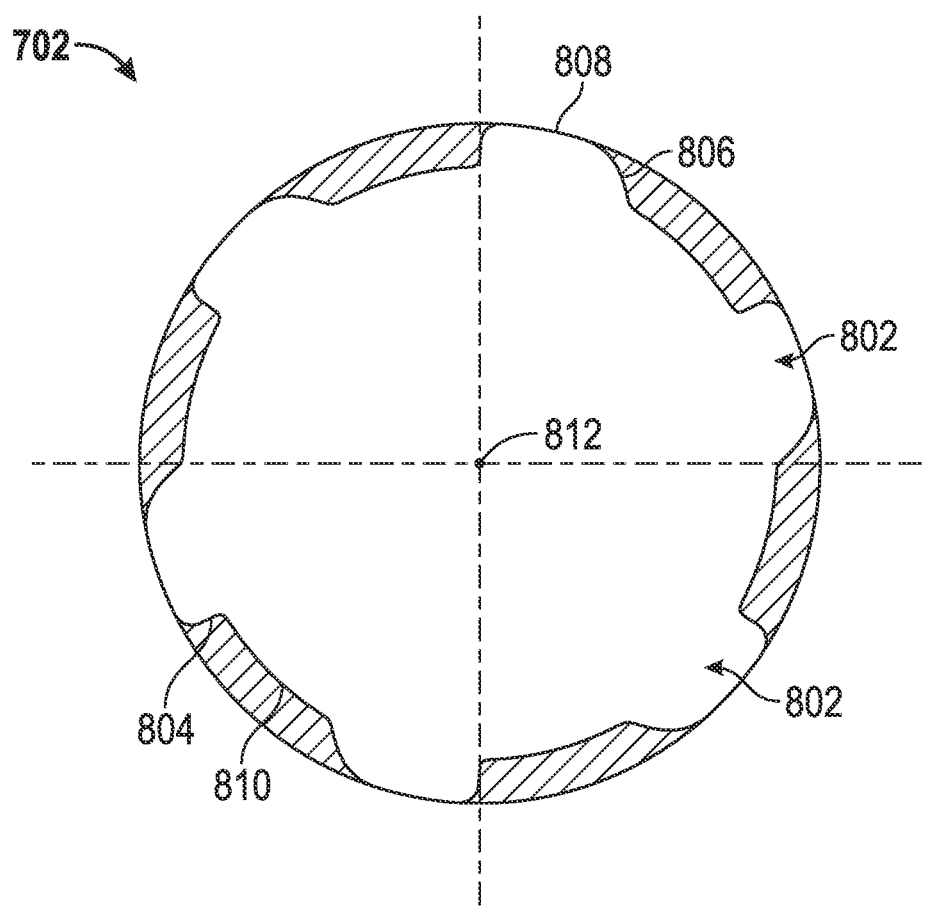
FIG. 8 representatively illustrates a cross-sectional view of the driver bit across line A-A in accordance with an exemplary embodiment of the present invention.
Figure 9:
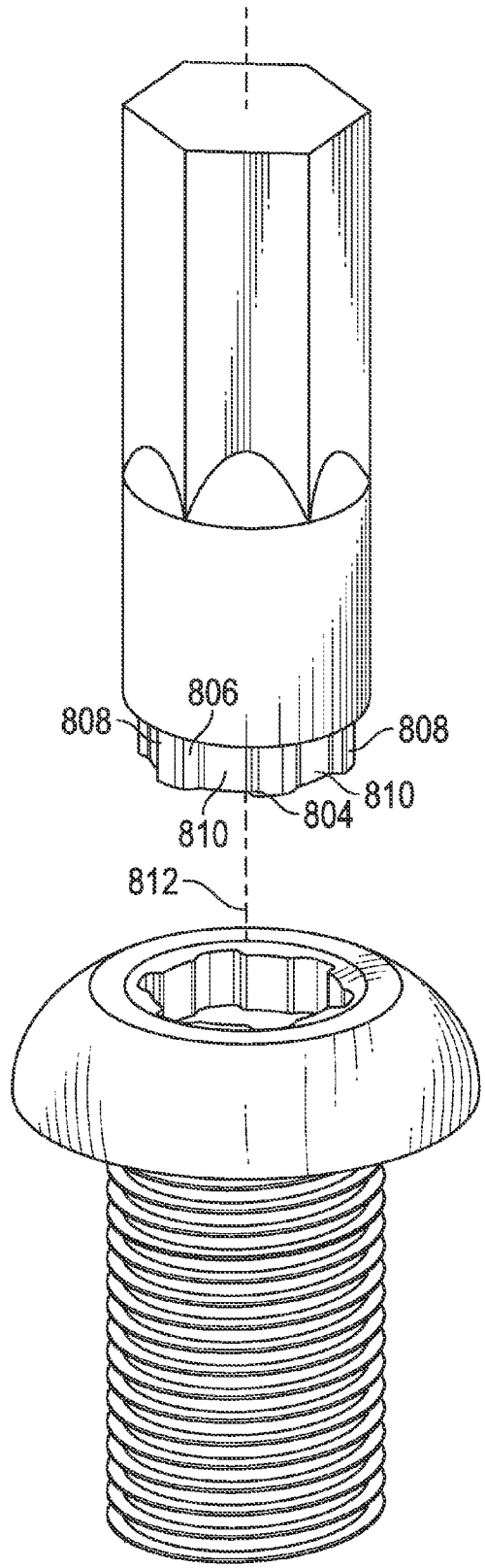
FIG. 9 representatively illustrates a side view of a drive wall and a removal wall of the driver in accordance with an exemplary embodiment of the present invention.

Referring now to FIGS. 8 and 9, the torque surface 702 may further comprise a plurality of lobes 802 that extend outward from a surface of the torque surface 702. The plurality of lobes 802 may be oriented around an axis 812 of the driver 102 that corresponds to the longitudinal axis 220 of the fastener 104 when the torque surface 702 is aligned with the recessed socket area 110.

Each lobe 802 may comprise a driving wall 804, a removal wall 806, and a first transition wall 808 extending between the driving wall 804 and the removal wall 806. The torque surface may also comprise a second transition wall 810 extending between the driving wall 804 of a first lobe 802 and the removal wall 806 of a second lobe 802. Each of these walls may be suitably configured to mate to a corresponding surface of the fastener 104. For example, the driving wall 804 may comprise a constant lobular height from the base portion 704 to the end portion 706 that equals the lobular height of the driving surface 210. In addition, the driving wall 706 may be configured to be aligned with the axis 812 of the driver 102 such that there is substantially complete face-to-face contact between the driving wall 804 and the driving surface 210 during engagement. This allows the driving force to be spread across a larger area than is achievable through known fastener systems that only provide localized contact between the driving surface and a corresponding surface within the fastening device.

Similarly, the removal wall 806 may be configured to have the same dimensions as the removal surface 212 such that there is substantially complete face-to-face contact between the removal wall 806 and the removal surface 212 during engagement. For example, the removal wall 806 may form a non-vertical line relative to the axis 812 of the driver 102 as it extends from the base portion 704 to the end portion 706 in an equivalent manner to the removal surface 212. The non-vertical line may lie on an angle that causes the first transition wall 808 to become progressively smaller as it descends toward the end portion 706. Likewise, as the driving wall 804, the removal wall 806, the first transition wall 808, and the second transition wall 810 progress to the end portion 706 of the torque surface 702, each surface tapers inwardly towards the central longitudinal axis 220 such that the polygonal shape of the lobes 802 have a smaller area at the end portion 706 than at the base portion 704.

The end result is that the torque surface 702 tapers the same in every dimension as the recessed socket area 110 and is the same size at every corresponding position to the recessed socket area 110. Accordingly, when the driver 102 is inserted into the recessed socket area 110, substantially the entirety of the torque surface 702 is in contact with every surface of the recessed socket area 110 both longitudinally and horizontally. The similar geometry allows the torque surface 702 to be wedged into the recessed socket area 110 to create a substantially 100% wedged fit between the driver 102 and the fastener 104 in all directions.

This wedged fit may further align the driver 102 and the fastener 104 during use by reducing tolerances between the torque surface 702 and the recessed socket area 110. Reduced tolerances may result in a decreased likelihood that the driver 102 may wobble within the recessed socket area 110 when the driving force or removal force is being applied which reduces the chances of cam out and/or disengagement. The wedge fit during use may also decrease plastic deformation on the driver wall 804, the driver surface 210, the removal wall 806, and/or the removal surface 212 which results in decreased wear on the torque surface 702 and the recessed socket area 110.

Figure 10:
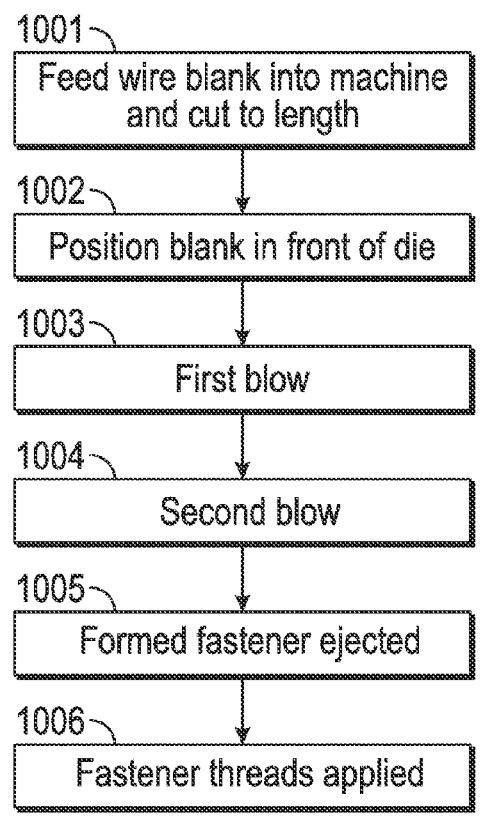
FIG. 10 is a flow chart for forming a fastener system in accordance with an exemplary embodiment of the present invention.

The recessed socket area 110 may be formed by any suitable method such as by forming, forging, casting, cutting, grinding, milling, and the like. In one embodiment, the fastener 104 and the recessed socket area 110 may be formed through a metal operation such as cold heading. For example, referring now to FIG. 10, a wire blank may be fed into a heading machine and cut to a predetermined length (1001). The wire blank may then be positioned in front of a die (1002). The wire blank may then be forced into the die by an upset tool in a first blow forming an intermediate shape (1003). A second blow may be applied to the intermediate shape with a hammer that is suitably configured to form a head height and a diameter of the head portion 108 of the fastener 104 (1004). The hammer may also comprise a drive suitably configured to form the recessed socket area 110 during the second blow. The fastener 104 may then be ejected from the header machine (1005) and moved to a subsequent operation such as to have threads applied to the shank portion 106 (1006). Subsequently, the drive may be subjected to additional operations to transform the drive into the driver 102 that will be used to apply the torque force to the fastener 104. Therefore, the dimensions of the wall 218 and the recessed torque surfaces 204 will be identical to the dimensions of the torque surface 702 since the driver 102 was used to form the recessed socket area 110.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A fastening device having a shank and a head portion having a recessed socket area extending into the head portion and sharing a longitudinal axis with the shank, comprising:
   a wall defining the recessed socket area having a top edge and a bottom edge, wherein the wall tapers inwardly towards the longitudinal axis between the top edge to the bottom edge; and
   a plurality of recessed torque surfaces disposed along the wall, wherein each recessed torque surface comprises:
      a driving surface disposed along a first side of the recessed torque surface and aligned substantially parallel with a radial line from the longitudinal axis to form a substantially flat face along the inward taper of the wall that remains vertical relative to the longitudinal axis of the shank;
      a removal surface disposed along a second side of the recessed torque surface, wherein:
         the removal surface forms an oblique angle to a second radial line from the longitudinal axis; and
         the wall along the removal surface is farther away from the driving surface at the top edge than the driving surface at the bottom edge; and
      a first transition surface extending between the driving surface and the removal surface of the recessed torque surface.

2. A fastening device according to claim 1, further comprising a second transition surface disposed along the wall between the driving surface of a first recessed torque surface and the removal surface of a second recessed torque surface from the plurality of recessed torque surfaces.

3. A fastening device according to claim 2, wherein:
   the second transition surface comprises a first width along the top edge; and
   the second transition surface comprises a second width along the bottom edge, wherein:
      the second width is greater than the first width; and
      the removal surface of the second recessed torque surface tapers away from the driving surface of the first recessed torque surface from the top edge to the bottom edge.

4. A fastening device according to claim 1, wherein:
   the first transition surface comprises a first width along the top edge; and
   the first transition surface comprises a second width along the bottom edge, wherein:
      the second width is less than the first width.

5. A fastening device according to claim 1, wherein the driving surface of each of the plurality of recessed torque surfaces comprises:
   a first a driving height along the top edge; and
   a second a driving height along the bottom edge, wherein the first and second driving height are equal and form a uniform driving height along the entire surface from the top edge to the bottom edge.

6. A driver for a fastening device, comprising:
   a torque surface comprising a tapering sidewall extending between a base portion and an end portion, wherein the wall tapers inwardly towards a longitudinal axis of the driver between the base portion to the end portion; and
   a plurality of lobes extending outward from the torque surface, wherein each lobe comprises:
      a driving wall disposed along a first side of the lobe and aligned substantially parallel with a first radial line from the longitudinal axis to form a substantially flat face along the inward taper of the tapering sidewall that remains vertical relative to the longitudinal axis of the driver;
      a removal wall disposed along a second side of the lobe, wherein:
         the removal surface forms an oblique angle to parallel to a second radial line from the longitudinal axis; and
         the tapering sidewall along the removal wall is farther away from the driving wall at the base portion than the driving wall at the end portion; and
      a first transition wall extending between the driving wall and the removal wall of the lobe.

7. A driver according to claim 6, further comprising a second transition wall disposed along the tapering sidewall between the driving wall of a first lobe and the removal wall of a second lobe from the plurality of lobes.

8. A fastening device according to claim 7, wherein:
   the second transition wall comprises a first width along the base portion; and
   the second transition wall comprises a second width along the end portion, wherein:
      the second width is greater than the first width; and
      the removal wall of the second lobe tapers away from the driving wall of the first lobe from the base portion to the end portion.

9. A fastening device according to claim 6, wherein:
   the first transition wall comprises a first width along the base portion; and
   the first transition wall comprises a second width along the end portion, wherein:
      the second width is less than the first width.

10. A driver according to claim 6, wherein the driving wall of each of the plurality of lobes comprises:
   a first a lobular height along the base portion; and
   a second a lobular height along the end portion, wherein the first and second lobular heights are equal and form a uniform lobular height along the entire surface from the base portion to the end portion.

11. A fastening system, comprising:
   a fastener having a shank portion, a head portion, and a longitudinal axis extending through the shank portion and the head portion, wherein the fastener comprises:
      a socket area recessed within the head portion, comprising a socket wall having a top edge and a bottom edge, wherein the socket wall tapers inwardly towards the longitudinal axis between the top edge to the bottom edge; and
      a plurality of recessed torque surfaces disposed along the socket wall, wherein each recessed torque surface comprises:
         a driving surface disposed along a first side of the recessed torque surface and aligned substantially parallel with a first radial line extending outward from the longitudinal axis to form a substantially flat face along the inward taper of the socket wall that remains vertical relative to the longitudinal axis of the shank; and
         a removal surface disposed along a second side of the recessed torque surface, wherein:
            the removal surface forms an oblique angle to a second radial line extending outward from the longitudinal axis; and the socket wall along the removal surface is farther away from the driving surface at the top edge than the driving surface at the bottom edge; and a driver configured to insertably mate with the socket area, wherein the driver comprises:

a torque surface having an inward tapering sidewall extending between a base portion and an end portion; and a plurality of lobes extending outward from the torque surface, wherein each lobe comprises:

a driving wall disposed along a first side of the lobe, wherein the driving wall is configured to substantially conform to the driving surface when the driver is inserted into the socket area; and a removal wall disposed along a second side of the lobe, wherein the removal wall is configured to substantially conform to the removal surface when the driver is inserted into the socket area.

12. A fastening system according to claim 11, wherein:
the fastener further comprises:

a first transition surface extending between the driving surface and the removal surface of a first recessed torque surface; and a second transition surface disposed along the socket wall between the driving surface of the first recessed torque surface and the removal surface of a second recessed torque surface from the plurality of recessed torque surfaces; and the driver further comprises:

a first transition wall extending between the driving wall and the removal wall of a first lobe; and a second transition wall disposed along the tapering sidewall between the driving wall of the first lobe and the removal wall of a second lobe from the plurality of lobes.

13. A fastening system according to claim 12, wherein:
the second transition surface comprises a first width along the top edge that corresponds to a substantially equal second width along the base portion of the second transition wall; and the second transition surface comprises a third width along the bottom edge that corresponds to a substantially equal fourth width along the end portion of the second transition wall, wherein:

the third width is greater than the first width; and the removal wall of the second lobe tapers away from the driving wall of the first lobe from the base portion to the end portion.

14. A fastening system according to claim 12, wherein:
the first transition surface comprises a first width along the top edge that corresponds to a substantially equal second width along the base portion of the first transition wall; and the first transition surface comprises a third width along the bottom edge that corresponds to a substantially equal fourth width along the end portion of the first transition wall, wherein:

the third width is less than the first width; and the removal wall tapers towards the driving wall from the base portion to the end portion.

15. A fastening system according to claim 11, wherein the driving wall of each of the plurality of lobes comprises:

a first lobular height along the base portion; and a second lobular height along the end portion, wherein the first and second lobular height are equal and form a uniform lobular height along the entire surface from the base portion to the end portion.

16. A method of forming a fastening system, comprising:
forming a drive for a hammer, wherein the drive comprises:

a torque surface comprising a tapering sidewall extending between a base portion and an end portion, wherein the wall tapers inwardly towards a longitudinal axis of the driver between the base portion to the end portion; and a plurality of lobes extending outward from the torque surface, wherein each lobe comprises:

a driving wall disposed along a first side of the lobe and aligned substantially parallel with a first radial line from the longitudinal axis to form a substantially flat face along the inward taper of socket wall that remains vertical relative to the longitudinal axis of the shank;

a removal wall disposed along a second side of the lobe, wherein:

the removal wall forms an oblique angle to parallel to a second radial line from the longitudinal axis; and the tapering sidewall along the removal wall is farther away from the driving wall at the base portion than the driving wall at the end portion; and a first transition wall extending between the driving surface and the removal surface of the lobe;

coupling the drive and hammer to a header machine;

cutting a wire blank to a pre-determined length;

positioning the cut wire blank adjacent to a die; and completing a head portion with the hammer in a blow from the header machine, wherein the drive forms a recessed socket area within the head portion having a plurality of recessed torque surfaces corresponding to the plurality of lobes.

17. A method according to claim 16, further comprising forming a set of threads on a shank portion of the wire blank.

18. A method according to claim 16, further comprising forcing the wire blank into the die with an upset tool in a first blow from the header machine to form an intermediate shape out of the wire blank prior to completing the head portion, wherein the intermediate shape comprises an unfinished head portion and a shank portion.

* * * * *